(12) United States Patent
Lal

(10) Patent No.: US 10,641,650 B2
(45) Date of Patent: May 5, 2020

(54) MOTION DETECTOR

(71) Applicant: Cirrus Logic International Semiconductor Ltd., Edinburgh (GB)

(72) Inventor: Anil Lal, Middlesex (GB)

(73) Assignee: Cirrus Logic, Inc., Austin, TX (US)

( * ) Notice: Subject to any disclaimer, the term of this patent is extended or adjusted under 35 U.S.C. 154(b) by 307 days.

(21) Appl. No.: 15/888,275

(22) Filed: Feb. 5, 2018

(65) Prior Publication Data

US 2018/0224325 A1 Aug. 9, 2018

Related U.S. Application Data

(60) Provisional application No. 62/455,888, filed on Feb. 7, 2017.

(51) Int. Cl.
| | |
|---|---|
| *G01H 9/00* | (2006.01) |
| *G01S 15/52* | (2006.01) |
| *G01S 7/527* | (2006.01) |
| *G06F 16/00* | (2019.01) |

(52) U.S. Cl.
CPC .......... *G01H 9/008* (2013.01); *G01S 7/5276* (2013.01); *G01S 15/526* (2013.01); *G06F 16/00* (2019.01)

(58) Field of Classification Search
CPC ..... G01H 9/008; G01S 7/5276; G01S 15/526; G01S 15/62; G01S 15/58; G06F 16/00; G06F 3/017
See application file for complete search history.

(56) References Cited

U.S. PATENT DOCUMENTS

| | | | |
|---|---|---|---|
| 4,961,039 A | 10/1990 | Yamauchi et al. | |
| 9,910,152 B2* | 3/2018 | Dahl | G06F 1/1626 |
| 2012/0106298 A1 | 5/2012 | Liu | |
| 2012/0224456 A1 | 9/2012 | Visser et al. | |

(Continued)

FOREIGN PATENT DOCUMENTS

| | | | | |
|---|---|---|---|---|
| EP | 2983063 A2 | | 2/2016 | |
| GB | 201706624 | * | 6/2017 | ........... G01S 15/526 |

(Continued)

OTHER PUBLICATIONS

Combined Search and Examination Report under Sections 17 and 18(3), UKIPO, Application No. GB1706624.2, dated Oct. 26, 2017.

(Continued)

*Primary Examiner* — Daniel Pihulic

(74) *Attorney, Agent, or Firm* — Jackson Walker L.L.P.

(57) ABSTRACT

An ultrasonic motion activity detector is configured to, in each of a series of frames: obtain an ultrasonic signal derived from a transmitted ultrasonic signal; derive an activity signal based on a difference between the obtained signal in a present frame and at least one previous frame; determine a peak value of the activity signal in a first time window of the frame; determine a peak value of the activity signal in a second time window of the frame, wherein the first time window is different from the second time window; calculate a ratio of the peak value of the activity signal in the first time window of the frame to the peak value of the activity signal in the second time window of the frame; and compare the calculated ratio with a threshold value, and, in frames in which the calculated ratio exceeds the threshold value, determine that there is motion of an object relative to the detector.

20 Claims, 10 Drawing Sheets

(56) References Cited

U.S. PATENT DOCUMENTS

| | | |
|---|---|---|
| 2013/0129102 A1 | 5/2013 | Li et al. |
| 2014/0029384 A1* | 1/2014 | Dahl .................... G06F 1/1626 367/95 |
| 2016/0044394 A1* | 2/2016 | Derom .................... H04R 1/00 367/95 |
| 2016/0091308 A1 | 3/2016 | Oliaei |
| 2018/0224325 A1* | 8/2018 | Lal ........................ G01S 7/5276 |

FOREIGN PATENT DOCUMENTS

| | | | | |
|---|---|---|---|---|
| GB | 2559427 A | * | 8/2018 | ........... G01S 7/5276 |
| WO | 2012131355 A1 | | 10/2012 | |
| WO | 2015074785 A1 | | 3/2015 | |
| WO | WO-2018146454 A1 | * | 8/2018 | ........... G01S 15/526 |

OTHER PUBLICATIONS

International Search Report and Written Opinion of the International Searching Authority, International Application No. PCT/GB2018/050265, dated Apr. 20, 2018.

* cited by examiner ular, such motion
MOTION DETECTOR

TECHNICAL FIELD

This invention relates to motion detection using ultrasonic signals. In particular, embodiments of the invention relate to a motion detector for use with a mobile device.

BACKGROUND

Ultrasonic signals can be used to provide motion detection of objects near devices. Such motion detection can then be used for gesture recognition purposes, or any other motion triggered procedure. In particdetection can be used to activate a function or application of a device or to bring a device in or out of a low-power mode.

The Doppler Effect can be used to detect movement of an object near the detector, by determining the frequency shift of the echoes from a transmitted continuous wave. Usually ultrasonic signals, for example above 20 kHz, are used to avoid interfering with everyday use of the device. Alternatively, a short pulse is transmitted and the time delay between transmission and receipt of an echo pulse is used to determine the distance of an object from the device during that particular time period. The distance determined during different time periods can then be compared to determine if the object is moving or not.

However, these techniques suffer from false detections of object motion due to acoustic sources emitting in the ultrasonic range, for example metallized or metallic objects rustling or jangling. Furthermore, if another motion detection device is being used nearby, the first device may detect and misinterpret the ultrasonic signals being emitted from the nearby device, again resulting in a false detection of object motion. The frequency shift signal obtained using Doppler methods conveys only information about velocity so does not distinguish objects at different distances, and therefore does not allow any control over the range of distances over which the detector responds. Methods relying on an estimate of distance may be confused by simultaneous reflections from multiple different moving objects or from different areas on the same moving object. Systems using Doppler methods also require relatively complex signal processing, and involve significant power consumption, making them unsuitable for continuous use.

SUMMARY

According to a first aspect of the present invention there is provided a method of detecting motion activity by means of a detector, the method comprising for each of a series of frames,
  obtaining an ultrasonic signal derived from a transmitted ultrasonic signal;
  deriving an activity signal based on a difference between the obtained signal in a present frame and in at least one previous frame;
  determining a peak value of the activity signal in a first time window of the frame;
  determining a peak value of the activity signal in a second time window of the frame, wherein the second time window is different from the first time window;
  calculating a ratio of the peak value of the activity signal in the first time window of the frame to the peak value of the activity signal in the second time window of the frame;
  comparing the calculated ratio with a threshold value; and
  determining that, in frames in which the calculated ratio exceeds the threshold values, there is motion of an object relative to the detector.

According to a second aspect of the present invention there is provided an ultrasonic motion activity detector comprising modules to, in each of a series of frames:
  obtain an ultrasonic signal derived from a transmitted ultrasonic signal;
  derive an activity signal based on a difference between the obtained signal in a present frame and at least one previous frame;
  determine a peak value of the activity signal in a first time window of the frame;
  determine a peak value of the activity signal in a second time window of the frame, wherein
    the first time window is different from the second time window;
  calculate a ratio of the peak value of the activity signal in the first time window of the frame to the peak value of the activity signal in the second time window of the frame;
  compare the calculated ratio with a threshold value, and, in frames in which the calculated ratio exceeds the threshold value, determine that there is motion of an object relative to the detector.

According to a third aspect of the present invention there is provided a computer program product, comprising a computer readable medium containing instructions for causing a processor to perform a method according to the first aspect.

According to a fourth aspect of the present invention there is provided a method of detecting motion of an object relative to a detector, the method comprising, at the detector:
  receiving an ultrasonic signal comprising a component received direct from a transmitter and at least one component reflected from said object;
  processing the received signal to remove any component that is constant from one time period to another time period and to obtain a signal that contains any reflected component due to motion of said object; and
  detecting motion of the object based on said obtained signal.

BRIEF DESCRIPTION OF THE DRAWINGS

For a better understanding of the present invention, and to show how it may be put into effect, reference will now be made, by way of example only, to the accompanying drawings, in which:—

DESCRIPTION

Embodiments of the present invention are able to detect motion of an object within a user specifiable distance range, ignoring any motion outside of this predefined range.

Figure 1:
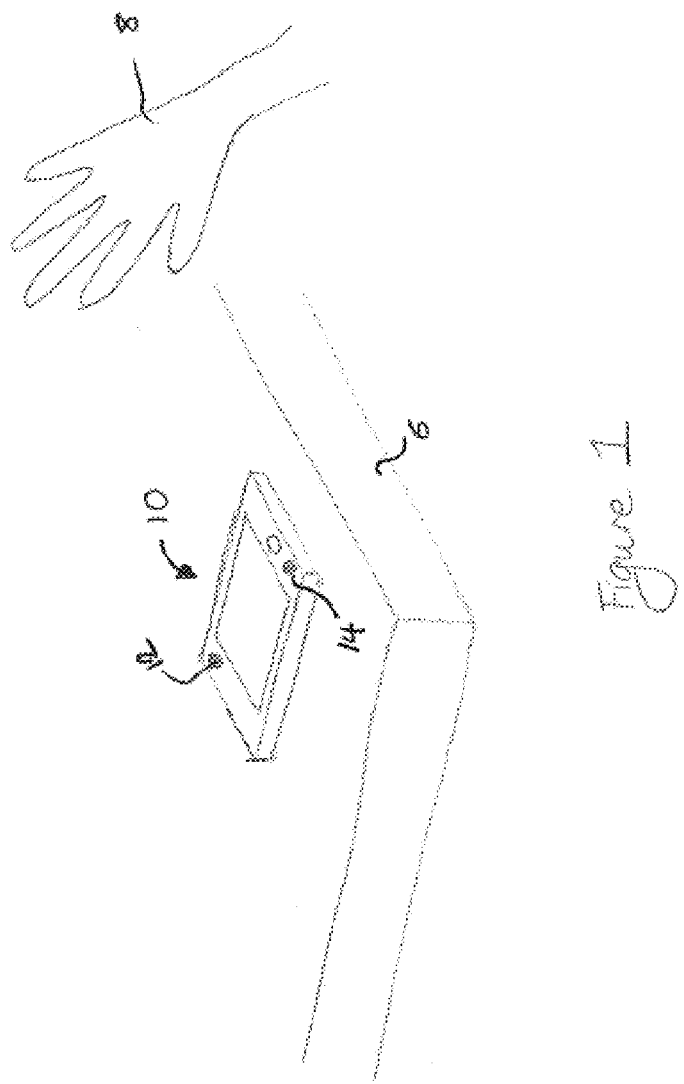
FIG. 1 illustrates a device.

FIG. 1 illustrates a use of a mobile device according to embodiments of the invention. A table 6 is illustrated with a user's hand 8 passing in the vicinity of the mobile device 10 positioned on the table 6.

The mobile device 10 comprises a speaker 12 and a microphone 14. It will be appreciated that the mobile device may comprise more speakers 12 and/or microphones 14 and that the position of the speakers 12 and microphones 14 may be different to those depicted by way of example here. In some embodiments, the distance between the microphone 14 and the speaker 12 may be less than 20 cm or may be less than 2 cm.

In this illustrative example, the mobile device 10 is a smartphone, but the invention as described herein is applicable to any sort of device, including devices intended to be used in a fixed location, such as motion sensors, cameras, monitors, or the like, and including other mobile devices such as laptop or tablet computers, games consoles, or the like.

The speaker 12 is configured to output an ultrasonic signal to be used to detect the motion of objects near to the mobile device 6, for example the user's hand 8. In some embodiments, the speaker 12 is also used to output conventional audio signals, typically in the audible range for use by the user of the mobile device 10. In other embodiments a speaker provided for outputting the ultrasonic signal may be separate from the speaker(s) used for audible signals. For the purposes of this document, audio signals may be considered as those signals audible by a human, conventionally taken as up to 20 kHz, although some audio signals may be limited in bandwidth by pre-processing or channel limitations to extend to a lower maximum frequency, say 8 kHz or 3.4 kHz for example. We will refer to either an ultrasonic (>20 kHz) or near ultrasonic (e.g. in the upper half of the audio band) as an ultrasonic signal.

In certain embodiments, some function or application of the device 10 is activated in response to the detection of motion near to the device. In certain embodiments, the device 10 may be brought in to or out of a low-power mode, for example an "always-on" largely inactive but listening state in response to the detection of motion near to the device.

The ultrasonic signal that is transmitted by the speaker 12 may be detected by the microphone 14, for example after reflecting off the user's hand 8, or any other nearby object. The ultrasonic signal that is transmitted by the speaker 12 will typically also be detected by the microphone 14 having travelled directly from the speaker to the microphone.

The microphone 14 may also be used to detect audio signals, for example user voice signals as would be used in a conventional mobile telephone device. Alternatively, separate microphones may be provided for detecting audible and ultrasonic signals respectively. However using the same microphone to detect audio and ultrasonic signals is advantageous in terms of component count, cost and may obviate the need for an additional aperture in the housing of the device and the associated risk of ingress of extraneous matter or fluids into the device.

Figure 2:
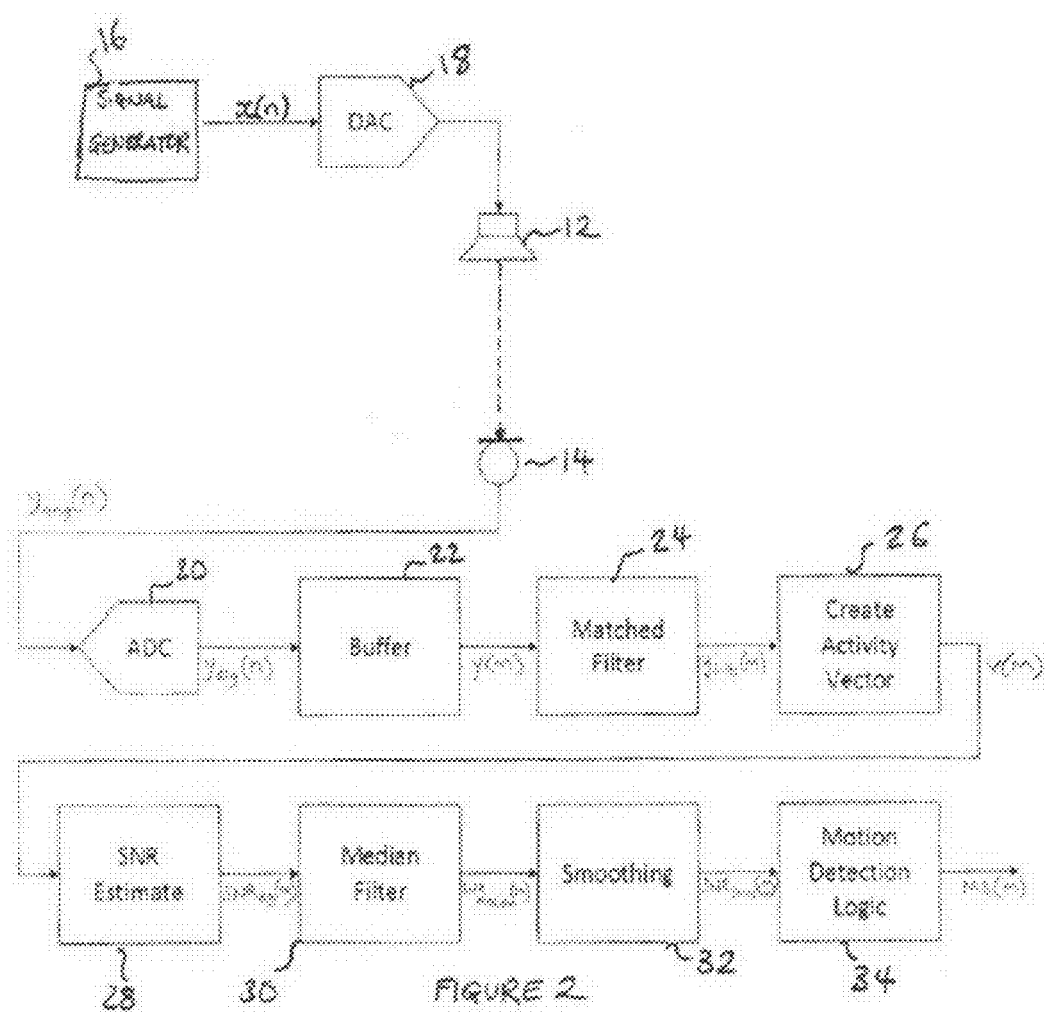
FIG. 2 is a block diagram, illustrating a form of the device shown in FIG. 1.

FIG. 2 is a block diagram illustrating an embodiment of the device 10 shown in FIG. 1. Each of the modules shown in FIG. 2 may be realised in hardware, in software running on a processor in the device 10 or elsewhere, or in a combination of hardware and software.

A signal generator 16 generates a sequence of ultrasonic signal samples x (n), which may be in digital form. This signal may be in the form of repeated frames of length K samples, with each frame comprising a sequence [p(0), p(1) . . . p(L−1)] of length L samples, as described in more detail below.

This signal x (n) may then be converted into an analog signal $x_{ang}(n)$ by a digital-to-analog convertor (DAC) 18 for outputting through the speaker 12. The DAC 18 may comprise a driver amplifier for driving the speaker 12 or such a driver amplifier may be a separate component (not illustrated) inserted between the DAC and the speaker. In some embodiments a similar signal may be generated by analog techniques.

The resulting acoustic signal output from the speaker 12 may be reflected off one or more objects before reaching the microphone 14. The distance travelled by the acoustic signal from the speaker via any reflector to the microphone determines the time at which the corresponding reflected acoustic pulse signal will reach the microphone 14. The acoustic signal detected by the microphone 14 and the resulting electrical detected signal $y_{ang}(n)$ may therefore comprise a component that has travelled over a direct path between the speaker and the microphone, and potentially one or more components reflected from nearby objects.

The analogue detected signal $y_{ang}(n)$ may be passed to an analog-to-digital convertor 20, for conversion into a digital detected signal $y_{dig}(n)$. A buffer 22 may store the digital signal in frames y(m) each comprising a sub-sequence of say K samples of the digital detected signal $y_{dig}(n)$.

Each stored frame y(m) of the detected signal may be input into a matched filter 24 in order to increase a signal to noise ratio of the detected signal. As shown in FIG. 2, and as described in more detail with reference to FIG. 3, the matched filter 24 may convert each stored frame y(m) of the detected signal to obtain a filtered signal $y_{filt}(m)=h*y(m)$, where * denotes the convolution operation and h=[p(L−1), p(L−2), . . . p(0)] is the time-reversed version of the pulse template p(l).

The obtained filtered signal may then be input into an activity signal creation block 26, which creates an activity signal v(m) based on the present frame m and at least one previous frame of the received signal.

The activity signal v(m) is passed to a signal-to-noise ratio (SNR) estimator 28, which estimates the ratio of the activity signal during a portion of the present frame in which a motion signal may be detected (for example a first time window) to the activity signal during a portion of the present frame in which the signal is expected to represent noise (for example a second time window).

The estimated SNR for the frame m, $SNR_{dB}(m)$ is passed to a median filter 30, which generates a filtered SNR signal $SNR_{median}(m)$ and this in turn is passed to a smoothing filter 32, which generates a smoothed SNR signal $SNR_{smoothed}(m)$.

This is passed to motion detection logic 34, which generates a signal MD(m) indicating whether motion has been detected in that frame. In some embodiments, $SNR_{median}(m)$, and $SNR_{smoothed}(m)$ or MD(m) may be generated only once per multiple frames, e.g. every alternate frame.

The operation of the device shown in FIG. 2 will now be described in more detail with reference to FIG. 3.

Figure 3:
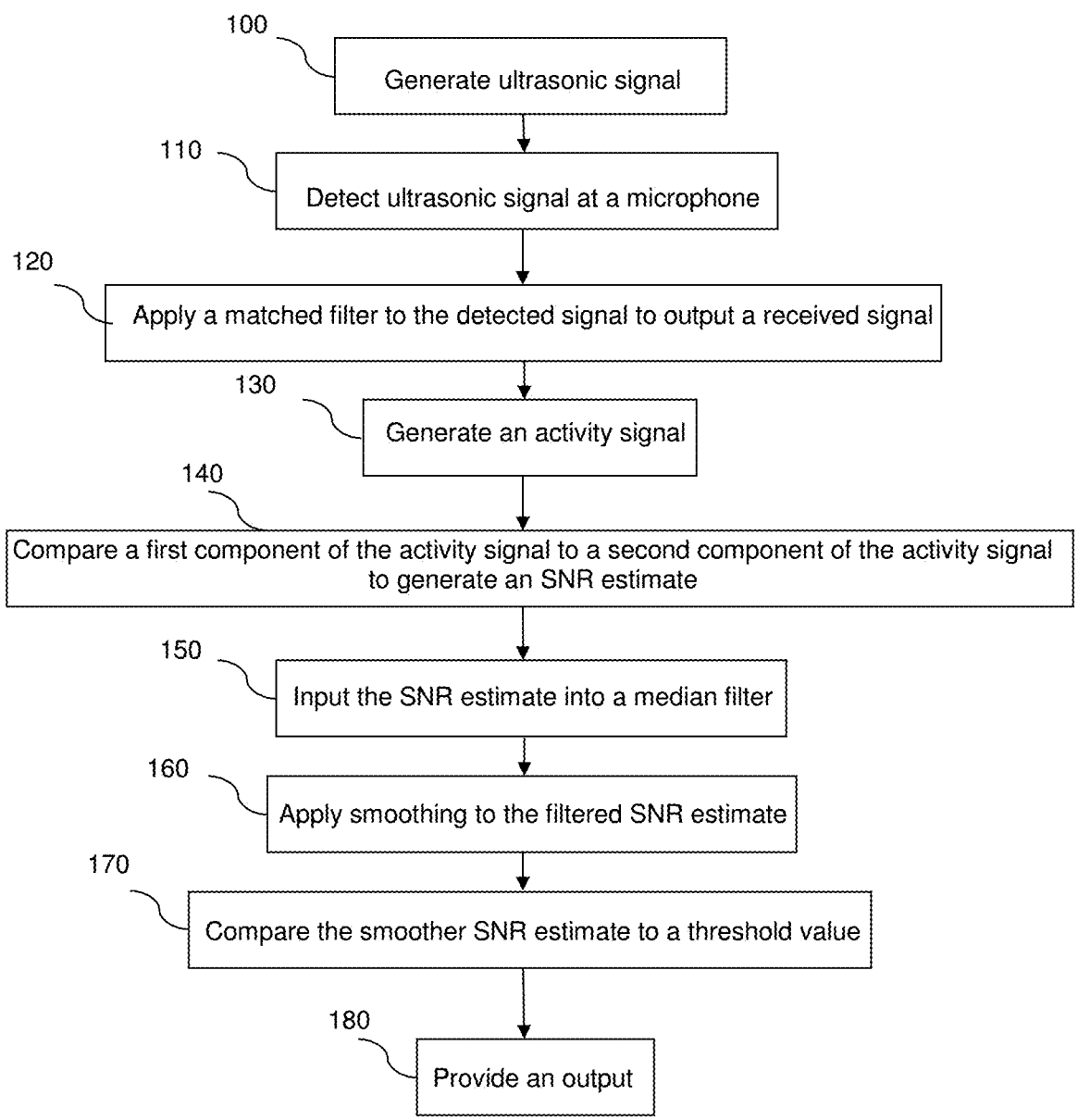
FIG. 3 is a flow chart, illustrating a method in accordance with an aspect of the invention.

FIG. 3 is a flow chart, illustrating a method in accordance with an aspect of the invention. The method contains steps that are performed by, or under the control of, one or more processor.

In step 100, an ultrasonic signal is generated.

The ultrasonic signal that is generated in step 100 is a pulse signal. In this example, time is divided into frames, and one pulse is transmitted in each frame. In this example, a motion detection decision is obtained once in each frame, and so the length of the frame determines the rate at which such decisions can be made. The method described herein uses signals that are reflected from a moving object within a certain range of the device, and so the length of the frame is chosen to be sufficiently long that such reflected signals are received comfortably within the same frame.

Figure 4:
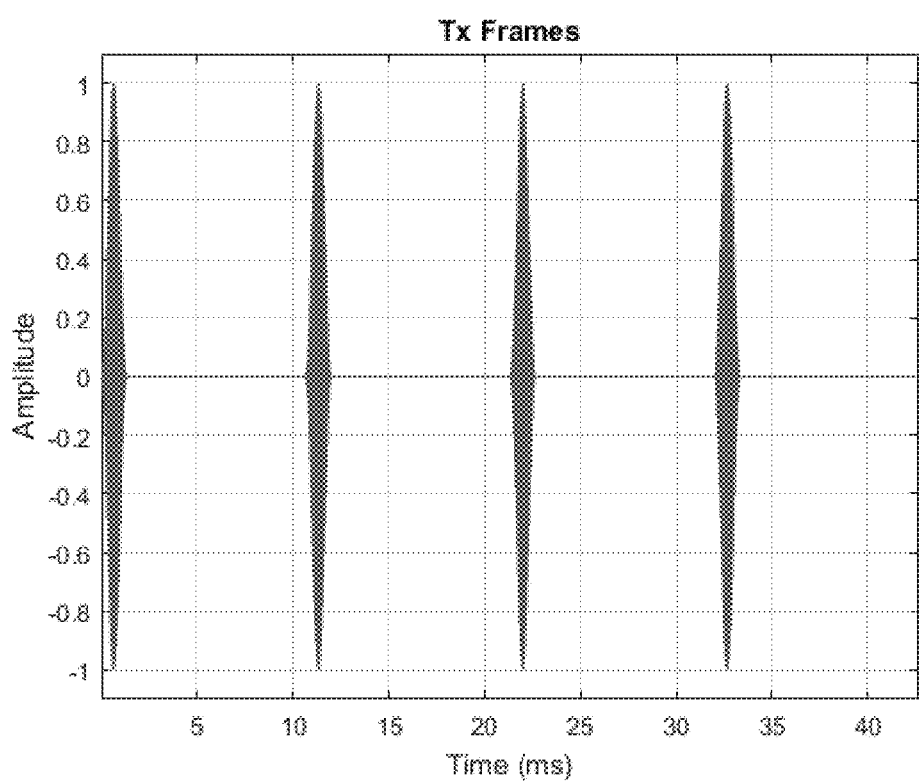
FIG. 4 illustrates a series of transmitted frames, each containing one pulse.

In this example, the frame length is chosen to be 10.66 ms. That is, the pulse repetition is 93.75 Hz. FIG. 4 shows a series of such frames, each containing one pulse.

Figure 5:
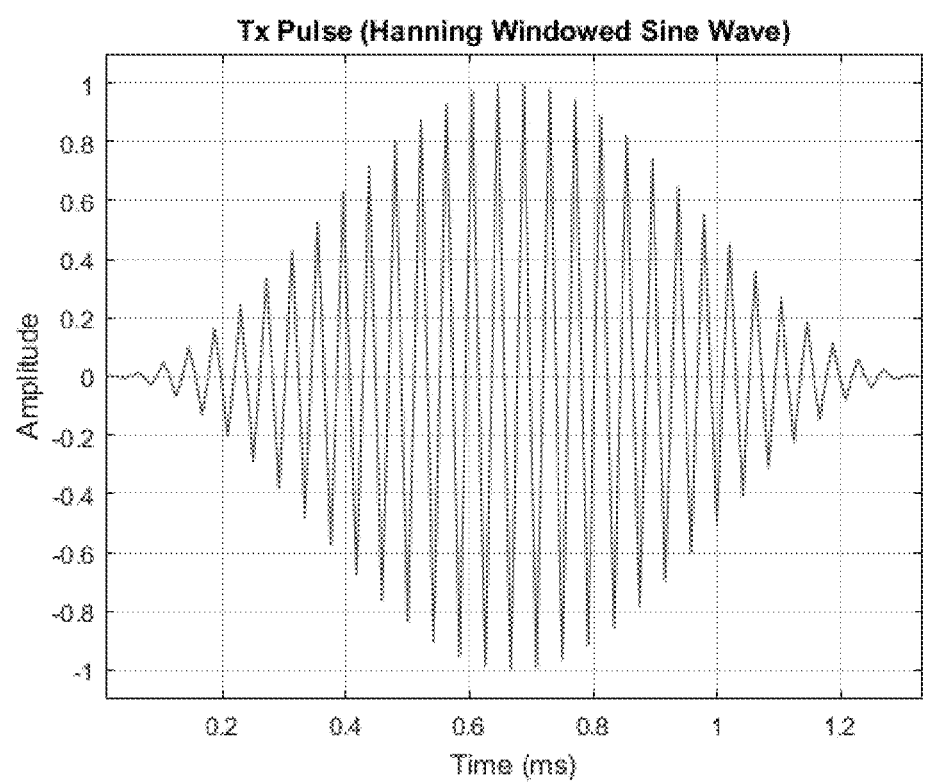
FIG. 5 illustrates a Hanning windowed sine wave pulse.

In this example, the pulse is a Hanning windowed sine wave, as shown in FIG. 5. That is, the pulse contains a carrier signal comprising a sine wave, to which is applied a Hanning window having a predetermined window length that defines the length of the pulse. However, it will be appreciated that the ultrasonic signal may be generated by applying a different window function to a sine wave or indeed an alternative carrier signal such as a bi-level, tri-level or triangle wave. Preferably the windowing function is tapered rather than being a simple rectangular function such that discontinuities in the signal are avoided and therefore any audible pops and clicks which may result from the pulse signal are avoided.

In this example, as shown in FIG. 5, the sine wave has a frequency of 24 kHz (that is, a period of ≈0.04 ms). This is sampled at 96 kHz, and the window length is 128 samples, giving a pulse length of 1.33 ms in the time domain.

Thus, the samples p(l) of the transmitted pulse can be denoted by a pulse template:

$$p(l)=[p(0), p(1), \ldots p(L-1)],$$

where L=128.

In step 110, an ultrasonic signal is detected by the microphone. The signal that is detected by the microphone includes a component that is received over a direct path between the speaker and the microphone. The signal that is detected by the microphone also includes at least one component that is reflected from any nearby object. If there is more than one nearby object, the signal that is detected by the microphone may include separate reflected components from each nearby object.

The signal that is detected by the microphone is applied to the analog-digital converter to form a digital signal $y_{dig}(n)$ that is segmented into frames, in the form:

$$y(m)=[y_m(0), y_m(1), y_m(k), \ldots y_m(K-1)],$$

where m is the frame index, k is the frame sample index and K is the frame length, in samples. These detected frames are, in this example, time aligned with the frames of the transmitted ultrasonic signal. In some embodiments it will be appreciated that the detected frames may not be time aligned with the transmitted frames, for example the start of the detected frames may be defined as delayed to compensate for the propagation delay of the direct path signal between the speaker and the microphone. In these embodiments the time shift between the transmitted and detected frames may be compensated for when selecting the time windows in order to ensure the desired distance range is accounted for, as will be discussed below.

In this illustrative example, the sampling rate of the analog-digital converter is the same as the sampling rate used in the transmitted signal, i.e. 96 kHz, and as before the frame length is 10.66 ms, i.e. 1024 samples.

Figure 6:
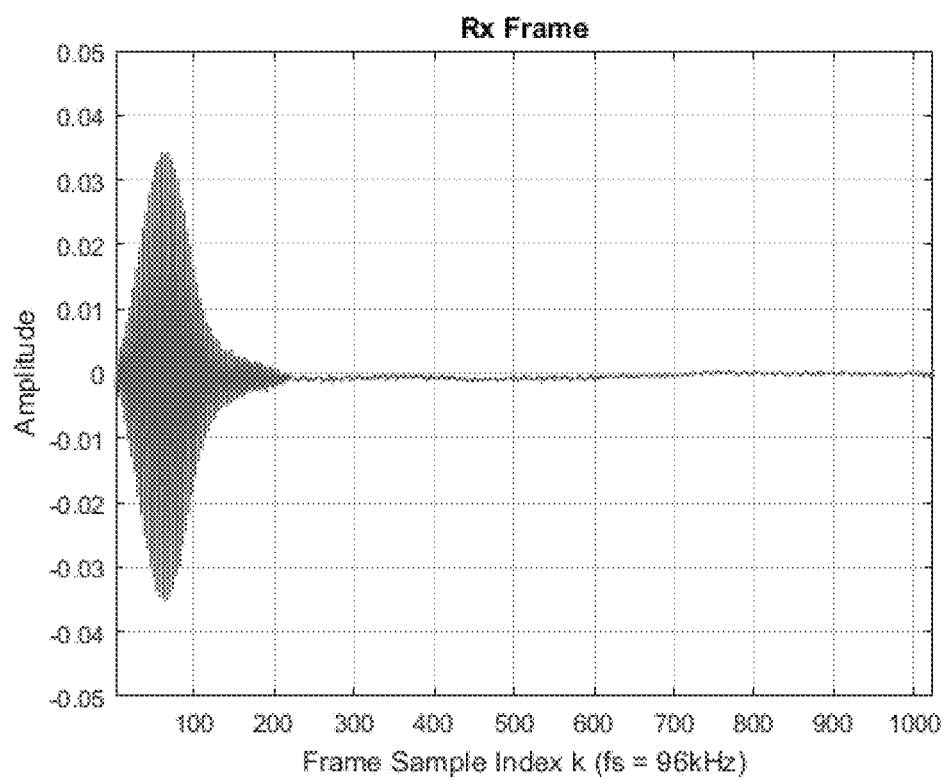
FIG. 6 illustrates an example of the form of one frame of the sampled signal that may be detected by a microphone.

FIG. 6 shows the form, in one example, of one frame of the sampled signal that was detected by the microphone. This contains a component from the signal detected on the direct path between the speaker and the microphone, and one or more multipath echoes of the transmitted signal. This signal frame may be stored in a buffer memory.

In step 120 of the process shown in FIG. 3, the detected signal stored in the buffer memory is applied to a matched filter which matches the detected signal to the transmitted ultrasonic signal template $[p(0), p(1) \ldots p(L-1)]$ to obtain a filtered signal frame $y_{filt}(m)$. This increases the signal to noise ratio of the detected signal by removing any noise uncorrelated to the transmitted ultrasonic signal, thereby ensuring that the filtered signal is focused on the echoes and direct path signal resulting from the transmitted ultrasonic signal.

That is, the stored signal frame y(m) is converted to a filtered signal frame $y_{filt}(m)=h*y(m)$ where * denotes the convolution operation and $h=[p(L-1), p(L-2), \ldots p(0)]$ is the time-reversed version of the pulse template.

Figure 7:
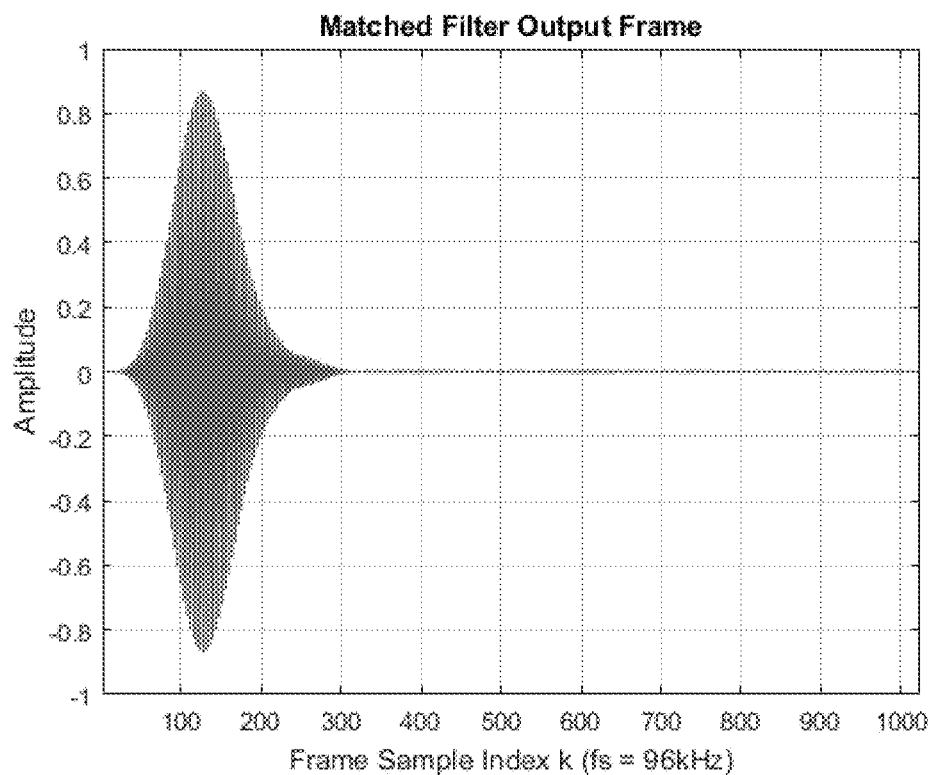
FIG. 7 illustrates an example of the form of one frame of the received signal at the output of the matched filter.

FIG. 7 shows the form, in this one example, of one frame of the output of the matched filter, i.e. a frame y(m) of the obtained filtered signal. The group delay and processing delay of the matched filter cause the peak to be delayed slightly, compared to the peak of the signal shown in FIG. 6. The filter also increases the size of the peak. The peak is caused by both the direct path signal and the detected echo signals. However typically the direct path signal will be stronger than the reflected signal and as illustrated here it may be difficult to distinguish the weaker reflected portion of the signal without complex further signal processing.

As mentioned above, the detected signal will contain at least a component from the signal that is received on the direct path between the speaker and the microphone. This component will occur in the same time region of every detected frame, and indeed will be generally identical in every frame. Similarly, a signal detected as an echo from a non-moving object will take a constant time-of-flight between the speaker and the microphone, and so this will also occur in the same time regions of the consecutive detected frames.

However, when an object in the vicinity of the detector is moving, a signal detected as an echo from the moving object will take a time-of-flight between the speaker and the microphone that will change as the location of the object changes. Therefore, the signal that is detected as an echo will occur in different time regions of the signal in successive detected frames. This is true of virtually any type of movement in the vicinity of the detector. Even if the motion is such that the locus of one point on an object is such as to define a constant total path length, e.g. an elliptical trajectory, the shape of the object and its trajectory are extremely unlikely to be such that this is true for every reflection point on the object. Multiple echoes are likely to be received from the movement of a single object due to uneven surfaces and non-uniform motion. This allows for movement in any direction to be detectable, if desired.

The relative motion of the detector to an object may also be detected: for example a reflecting object may be stationary and the device comprising a speaker and microphone may be moving. However, if required, the movement of the detector itself can be ignored by incorporating signals from other device sensors indicating that the device itself is being moved.

In step 130 of the process shown in FIG. 3, an activity signal is generated.

In this example, the activity signal is obtained by subtracting the sample values of the filtered signal obtained in the previous frame from those in the current frame. Alternatively, an average of a number of previous frames may be taken and the average sample values subtracted from those in the current frame to obtain the activity signal. Either method removes the effect of the signals that are unchanged between frames and emphasising the effect of the signals that change from one frame to the next.

In this example, the activity signal is calculated using the signal obtained from the matched filter. However, in other examples, the activity signal may be calculated using the signal obtained from the analog-to-digital convertor 20, either directly or after some other form of processing, or using a signal obtained from a digital microphone.

The signals transmitted by a nearby similar device may either be synchronous, in which case they will occur at approximately the same time within each frame, and will therefore be cancelled by the creation of the activity vector, or may be asynchronous in which case they will often fall into the second time window and be interpreted similarly to general background ultrasonic noise for example high frequency noise sources such as metallized or metallic objects rustling.

The activity signal v(m) for the frame with the frame index m may therefore in some embodiments be defined as:

$$v(m)=\hat{y}(m)-\hat{y}(m-1).$$

Figure 8:
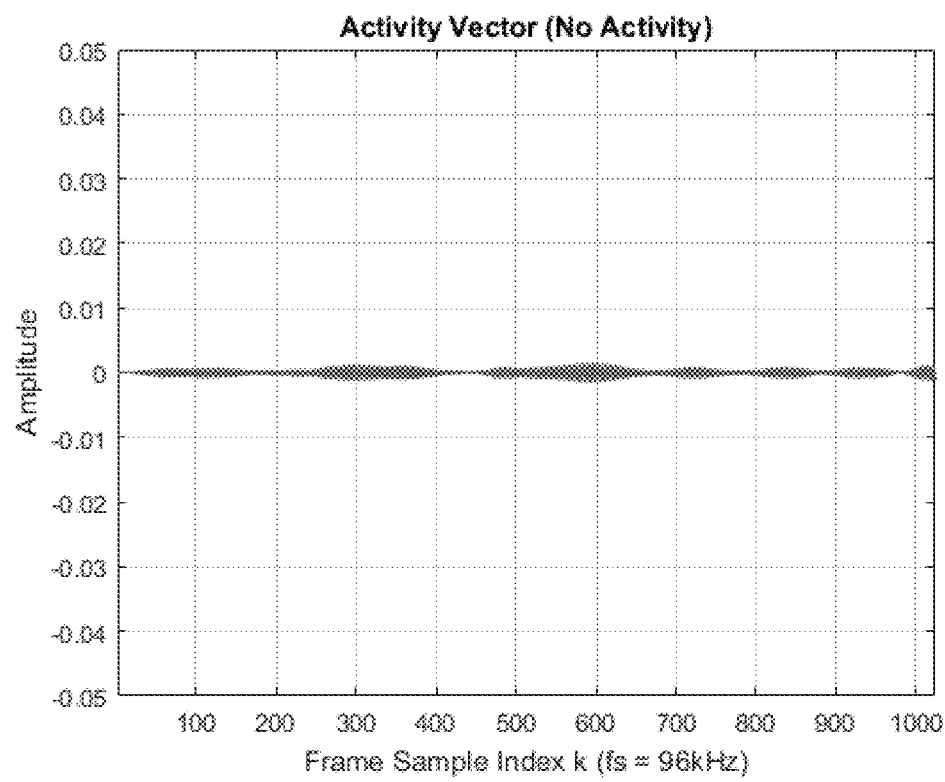
FIG. 8 illustrates an example of an activity signal calculated for a frame during which there was no nearby moving object.

FIG. 8 shows an example of an activity signal v(m) calculated for a frame during which there was no nearby moving object. Because the entire signal is largely unchanged between the previous frame and the current frame, the activity signal shown in FIG. 8 is at a very low level. This residual activity signal is a result of general background noise in these measurement conditions.

Figure 9:
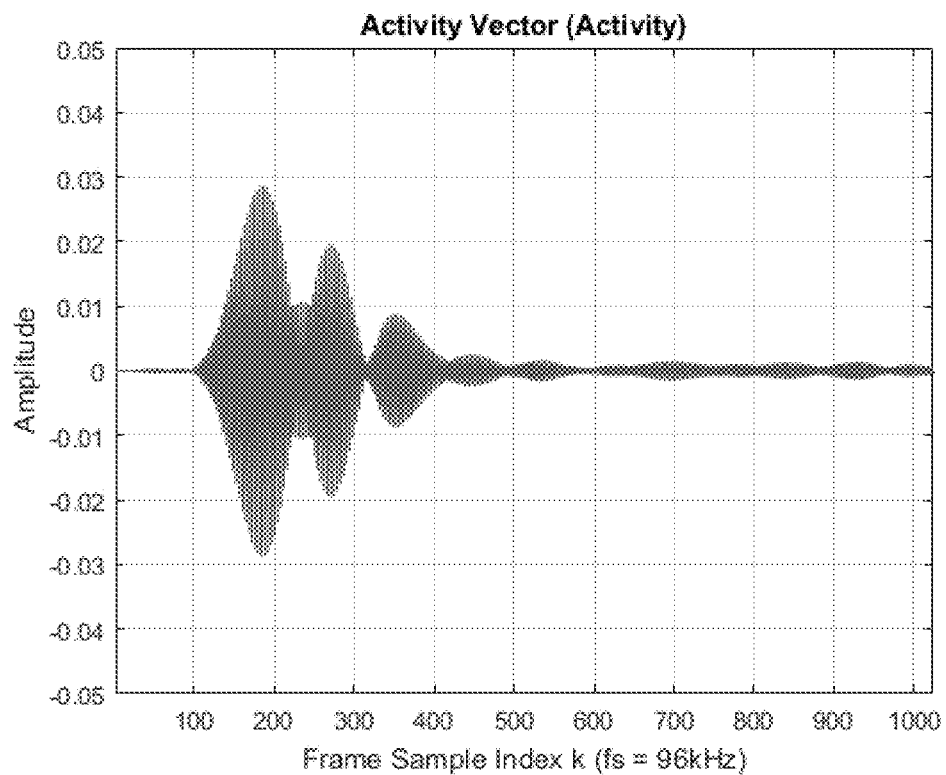
FIG. 9 illustrates an example of an activity signal calculated for a frame during which there was a nearby moving object.

FIG. 9 shows an example of an activity signal v(m) calculated for a frame during which there was a nearby moving object. Because the received signal includes a component that was altered from the previous frame, the activity signal shown in FIG. 9 is at a significantly non-zero level for a part of the frame.

The location of any moving object will determine the effect of that object on the activity signal. Any component of the received signal that is reflected from a more distant object will occur later in the frame than a component of the received signal that is reflected from an object or point on an object that is closer to the detector. Similarly, a reflection from a more distant object will be weaker than a reflection from an object closer to the detector, all other things being equal due to the spreading of the transmitted and reflected acoustic waves with distance and due to further transmission losses through the air which may be substantial for ultrasonic waves.

The pulse repetition frequency is chosen to be slow enough (and, equivalently, the frame length is chosen to be long enough), that any moving object, which is sufficiently far from the detector that its reflection would occur near the end of the frame, will produce a very weak reflection.

Thus, in the case of FIG. 9, this form of activity signal indicates that there is a moving object that is close enough to the detector to produce an activity signal at a significant level during frame samples 100-400. However, the absence of an activity signal at a significant level during frame samples 600-1000 only indicates that, if there was a moving object at a distance that would produce an activity signal during those frame samples, the reflections from that object are too weak to have a significant effect.

In step 140 of the process shown in FIG. 3, a first component of the activity signal, during those samples of the frame in which the signal would result from motion of interest, is then compared with a second component of the activity signal during those samples of the frame in which the signal would result mainly from noise. In some embodiments, this is referred to as a signal-to-noise ratio (SNR), which is determined by the SNR estimator 28 in FIG. 2.

Specifically, the SNR estimator may determine the first component as a value of the activity signal in a first time window of the frame, and may determine the second component as a value of the activity signal representing noise in a second time window of the frame. The first time window may be different from the second time window.

The lengths of the first and second time windows can be set, for example, by the device manufacturer. In particular the length of the first time window can be set based on the range within which the motion is intended to be detected. In some examples a motion detection range may be between 1 cm and 30 cm. An object at a distance of 30 cm will cause a reflection after a time of ≈2 ms. In an example similar to that illustrated here, with a ≈10 ms frame length, a time of ≈2 ms is ≈200 samples out of 1024.

Thus, setting a first time window that extends only a short way into the frame means that only reflections from nearby objects will fall within the first time window, while setting a first time window that extends further into the frame means that reflections from slightly more distant objects will fall within the first time window.

The start of the first time window may occur at the start of the frame, or may occur after the start of the frame, for example in order to compensate for the matched filter delay or to ignore signals with delay shorter than the direct path delay.

If the start of the first time window is fixed, then setting a shorter first time window means that only reflections from nearby objects will fall within the first time window, while setting a longer first time window means that reflections from slightly more distant objects will fall within the first time window.

The second window is set so that it is not expected that any significant echoes will be received during that period, because any objects that are far enough away that they might cause such long-delayed echoes will also be expected to generate very weak echoes.

In some examples the first and second time windows may overlap. However, in this example the first and second time windows do not overlap. In this example a gap is provided between the first and second time window. This gap may improve the signal-to-noise ratio as it avoids any frequency echoes which may occur towards the end of the first time window. The end of the time window may be defined early in order to avoid detecting echoes which may occur at distances where the reflected signal may be weak and hard of distinguish form noise in order to avoid unreliably flagging activity. The start of the second time window may be defined delayed in order to avoid the estimate of noise being possibly contaminated by residual signal activity due to such late echoes.

The form of the waveform in FIG. 9 implies there are actually multiple reflections, possibly from different objects or from multiple points on the same object. Such a scenario might confuse prior art methods which rely on calculating a single distance of a reflecting object per frame and trying to extract its velocity from inter-frame differences of this single calculated distance.

Figure 10:
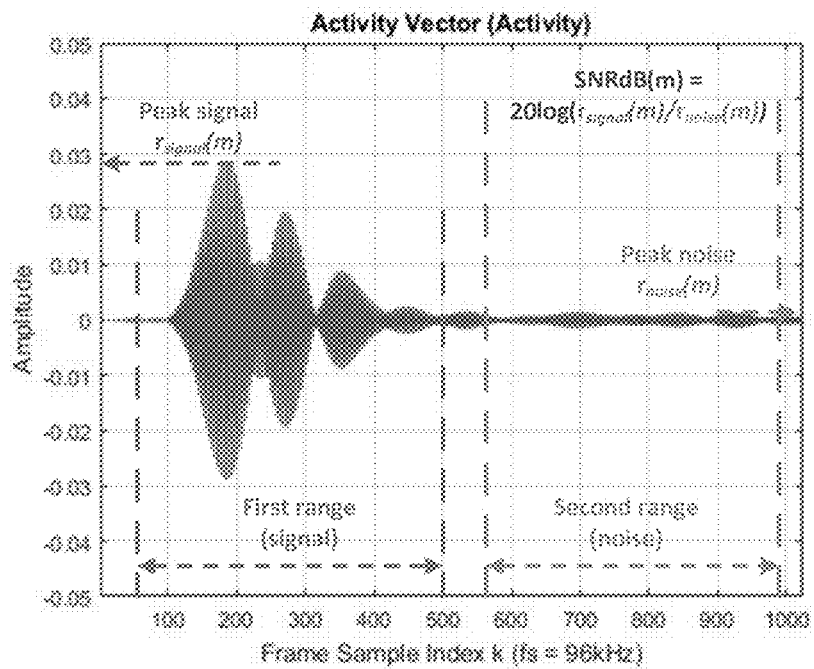
FIG. 10 illustrates an example of a first time window and a second time window in a frame.

FIG. 10 shows an example in which the first time window extends from samples 60-500 of the frame, and the second time window extends from samples 560-990 of the frame. In other examples, the first time window may be considerably shorter than the second time window (for example less than half, or less than a quarter of the length).

In other examples, there may be a significantly long gap (for example more than one third of the length of the frame, or longer than either the first or second time window) between the first and second time windows. For example, the first time window may extend from samples 136-200 of the frame, and the second time window may extend from samples 700-1024 of the frame.

In this example, the SNR estimator may determine the first component as a peak value of the activity signal in the first time window of the frame, and may determine the second component as a peak value of the activity signal in the second time window of the frame.

In some embodiments, determining a peak value of the activity signal in a first time window of the frame comprises determining the largest value of a magnitude of the activity signal in the first time window of the frame. Determining the largest value of the magnitude of the activity signal in the first time window of the frame may comprise squaring individual sample values of the activity signal, and determining the largest value of the squared individual sample values of the activity signal in the second time window of the frame.

For example, the peak value of the activity signal in the first time window can be given as:

$$r_{signal}(m) = \max(v_{signal}(m)),$$

where $$v_{signal}(m) = [v_m(K_{signal\ min})^2, v_m(K_{signal\ min}+1)^2 \ldots, v_m(K_{signal\ max})^2],$$

and $K_{signal\ min}$ is the lowest sample index within the first time window of the activity signal and $K_{signal\ max}$ is the highest sample index within the first time window of the activity signal. Defining the lowest and highest sample indexes for the first time window therefore defines the signal region of the activity signal in each frame, and this allows the motion detection range to be controlled.

Similarly, determining a peak value of the activity signal in a second time window of the frame may comprise determining the largest value of a magnitude of the activity signal in the second time window of the frame. Determining the largest value of the magnitude of the activity signal in the second time window of the frame may comprise squaring individual sample values of the activity signal, and determining the largest value of the squared individual sample values of the activity signal in the second time window of the frame.

In this case, the peak value of the activity signal in the second time window can be given as:

$$r_{noise}(m) = \max(v_{noise}(m)).$$

where $$v_{noise}(m) = [v_m(K_{noise\ min})^2, v_m(K_{noise\ min}+1)^2 \ldots, v_m(K_{noise\ max})^2].$$

and $K_{noise\ min}$ is the lowest sample index within the second time window of the activity signal and $K_{noise\ max}$ is the highest sample index within the second time window of the activity signal.

An SNR estimate can then be calculated from the peak value of the activity signal in the first time window and the peak value of the activity signal in the second time window. In some embodiments the SNR estimate for the frame is calculated as a ratio the peak value of the activity signal in the first time window of the frame to the peak value of the activity signal in the second time window of the frame. Thus, in some embodiments the SNR estimate can be found by:

$$SNR_{dB}(m) = 10\ \log\left(\frac{r_{signal}(m)}{r_{noise}(m)}\right).$$

In other embodiments the peak value for the first time window or the second time window may be derived taking the absolute value of each sample rather than taking the square. Alternatively the peak maximum and minimum sample values may be separately derived and the largest absolute value of these peak values selected, or the signal may be regarded as approximately symmetrical and only say the peak positive value derived.

In further embodiments, the peak value for the first time window or the second time window may be derived by calculating an average value of the magnitude of the signal, for example a mean square or root-mean-square of all the samples in a time window. This average may then be normalised by a factor obtained by assuming some peak-to-average ratio, or this factor may simply be ignored, and the resulting constant scaling or shift in the SNR parameter allowed for by appropriately adjusting threshold values that are later applied as described below.

Figure 11:
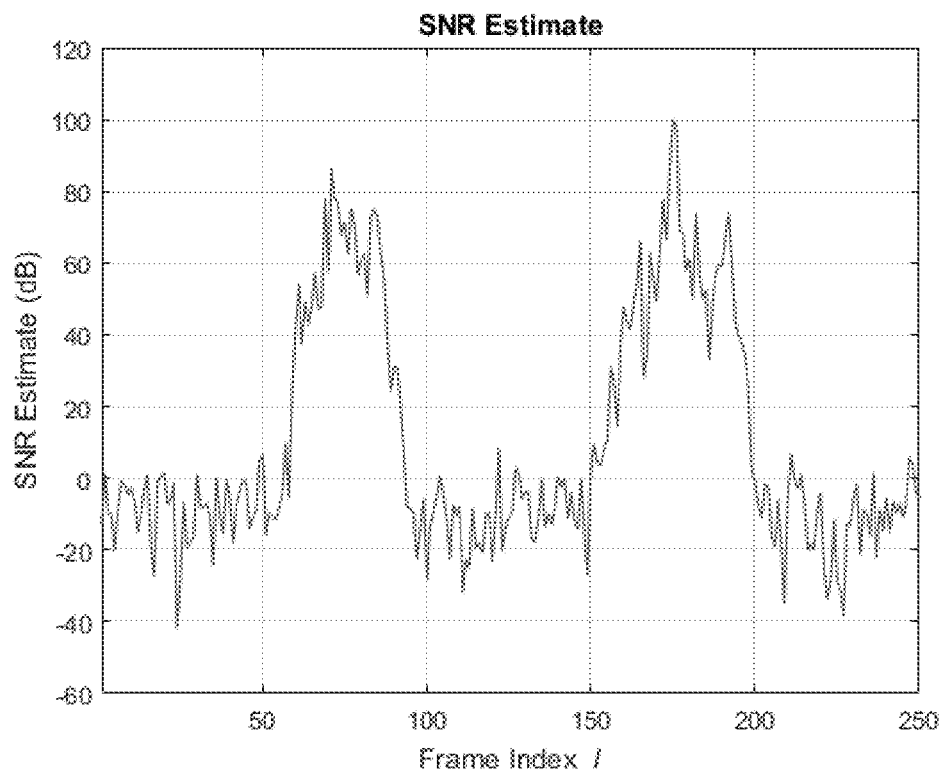
FIG. 11 illustrates one possible form of the SNR signal for a sequence of 250 consecutive frames.

FIG. 11 illustrates one possible form of the SNR signal for a sequence of 250 consecutive frames.

In step 150 of the process shown in FIG. 3, the SNR estimate may then be input into a median filter 30 to help remove any outlying values. The median filter 30 may for example output:

$$SNR_{medium}(m) = \mathrm{median}(SNR_{dB}(m-L_{med}-1), \ldots \\ SNR_{dB}(m)),$$

where $L_{med}$ is the median filter length. Thus, the output of the median filter is the median value of the SNR from amongst the $L_{med}$ most recently calculated SNR values.

Figure 12:
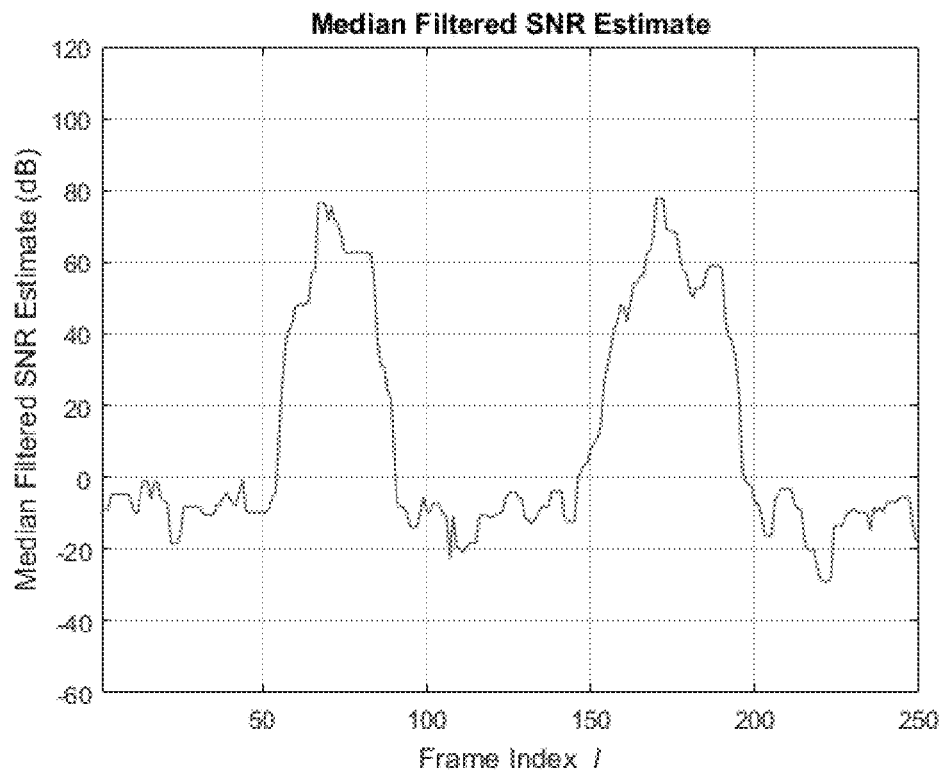
FIG. 12 illustrates an effect of the filtering on the SNR signal shown in FIG. 11 for the same sequence of 250 consecutive frames.

FIG. 12 illustrates an effect of the filtering on the SNR signal shown in FIG. 11 for the same sequence of 250 consecutive frames.

In step 160 of the process shown in FIG. 3, this may then be smoothed by smoothing block 32 using recursive averaging to smooth large transitions that can occur from the median filtering. For example, the smoothing block 32 may output:

$$SNR_{smoothed}(m) = \alpha SNR_{median}(m-1) + \alpha SNR_{median}(m),$$

where $\alpha$ is a smoothing parameter.

In step 170 of the process shown in FIG. 3, this smoothed SNR estimate, $SNR_{smoothed}(m)$ may then be input into the motion detection logic block 34.

Figure 13:
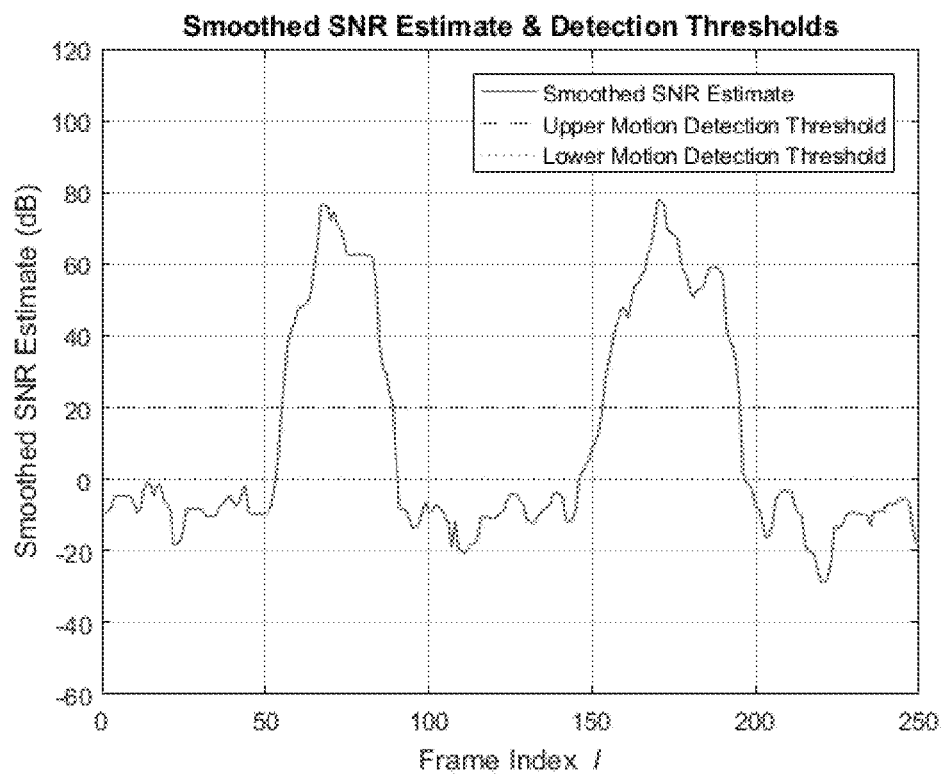
FIG. 13 illustrates an effect of the smoothing on the SNR signal shown in FIGS. 11 and 12 for the same sequence of 250 consecutive frames.

FIG. 13 illustrates an effect of the smoothing on the SNR signal shown in FIGS. 11 and 12 for the same sequence of 250 consecutive frames.

It will be appreciated that other filtering and/or smoothing methods may be used to remove outliers and to smooth large transitions within the SNR estimate. Alternatively the SNR estimate obtained in step 140 may be input directly into the motion detection logic block 34.

In step 170 of the process shown in FIG. 3, the motion detection logic block 34 compares the input SNR estimate with a threshold value to determine whether or not any motion of any object has occurred between the current frame and the at least one previous frame that was considered when the activity signal was derived.

In some embodiments when the activity signal is greater than the threshold value the motion detection logic block 34 outputs a motion detection flag indicating that motion of an object has been detected. If the activity signal is less than the threshold value the motion detection logic block 34 outputs a motion detection flag indicating that there is no motion detected.

In some embodiments, as shown in FIG. 13, a first, upper, threshold value and a second, lower, threshold value are provided. Hysteresis is then applied to these threshold values such that if the activity signal moves above the first threshold value the motion detection logic block will output a motion detection flag indicating that motion is detected and if the activity signal drops below the second threshold value the motion detection logic block will output a motion detection flag indicating that motion is no longer detected.

In step 180 of the process shown in FIG. 3, an output is provided. In some embodiments the output is used to activate or deactivate a function or application of a mobile device.

Figure 14:
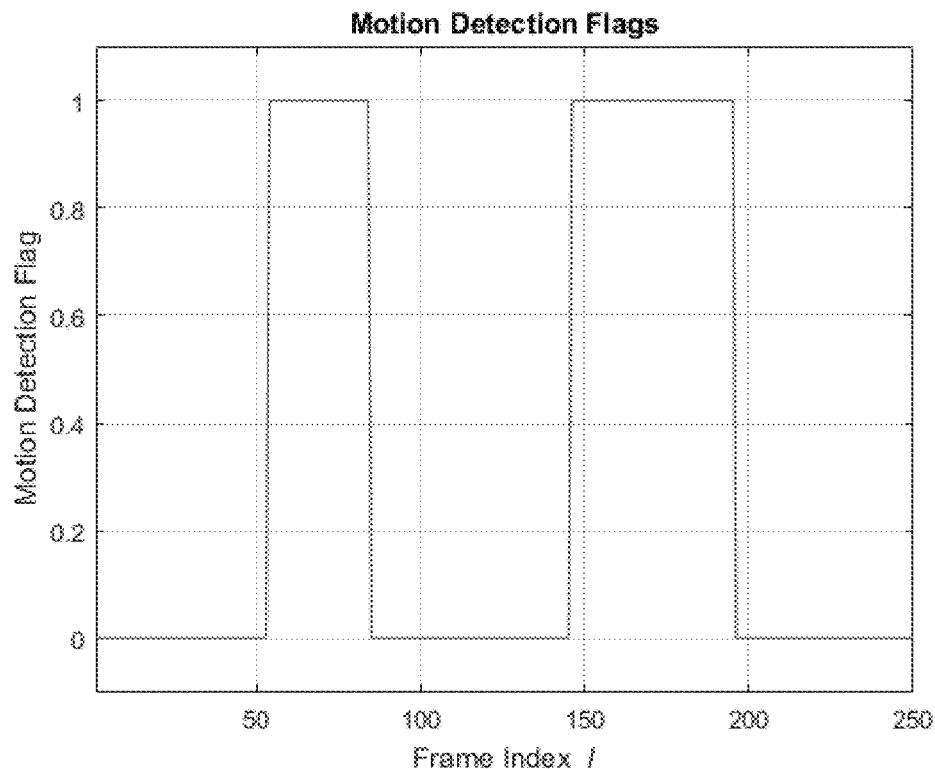
FIG. 14 illustrates a state of the output flag(s) in the case of the signal shown in FIGS. 11, 12 and 13 for the same sequence of 250 consecutive frames.

FIG. 14 illustrates a state of the output flag(s) in the case of the signal shown in FIGS. 11, 12 and 13 for the same sequence of 250 consecutive frames.

The embodiment described above uses a single speaker 12 and single microphone 14. In some embodiments there may be multiple microphones each obtaining a distinct acoustic signal. These may be processed as above to generate separate output flags which may be logically combined, for example in an AND or OR fashion, for example to detect motion in different zones around the device. Similarly there may be a plurality of speakers 12 transmitting the same or different acoustic stimuli at the same or different times, for example in alternate frames with the corresponding detected responses being processed in say alternate sets of frames.

There is therefore provided a method and apparatus for detecting motion of an object within a user or manufacturer specifiable distance range, ignoring any apparent motion outside of this predefined range and insensitive to multiple simultaneous reflections.

As used herein, the term 'module' shall be used to at least refer to a functional unit or block of an apparatus or device. The functional unit or block may be implemented at least partly by dedicated hardware components such as custom defined circuitry and/or at least partly be implemented by one or more software processors or appropriate code running on a suitable general purpose processor or the like. A module may itself comprise other modules or functional units.

This software code may be stored in the device as firmware on some non-volatile memory e.g. EEPROM to preserve program data when the battery becomes discharged or is removed for replacement.

It should be understood—especially by those having ordinary skill in the art with the benefit of this disclosure— that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element. Further embodiments likewise, with the benefit of this disclosure, will be apparent to those having ordinary skill in the art, and such embodiments should be deemed as being encompassed herein.

The invention claimed is:

1. A method of detecting motion activity by means of a detector, the method comprising for each of a series of frames,
   obtaining an ultrasonic signal derived from a transmitted ultrasonic signal;
   deriving an activity signal based on a difference between the obtained signal in a present frame and in at least one previous frame;
   determining a peak value of the activity signal in a first time window of the frame;
   determining a peak value of the activity signal in a second time window of the frame, wherein the second time window is different from the first time window;
   calculating a ratio of the peak value of the activity signal in the first time window of the frame to the peak value of the activity signal in the second time window of the frame;
   comparing the calculated ratio with a threshold value; and
   determining that, in frames in which the calculated ratio exceeds the threshold values, there is motion of an object relative to the detector.

2. The method as claimed in claim 1, further comprising generating the transmitted ultrasonic signal by applying a tapered window function to a carrier signal.

3. The method as claimed in claim 1, wherein the step of generating the transmitted ultrasonic signal comprises generating a Hanning windowed sine wave pulse.

4. The method as claimed in claim 1, wherein the first time window and the second time window do not overlap.

5. The method as claimed in claim 4, wherein there is a gap in time in between the first time window and the second time window.

6. The method as claimed in claim 1, further comprising:
receiving from a microphone a detected ultrasonic signal derived from the transmitted ultrasonic signal, and
generating the obtained signal from the detected ultrasonic signal.

7. The method as claimed in claim 6, comprising generating the obtained signal by filtering the detected ultrasonic signal.

8. The method as claimed in claim 7, wherein the step of filtering the detected ultrasonic signal comprises applying a matched filter to the detected signal, wherein the matched filter matches the detected signal to a template used to generate the transmitted ultrasonic signal.

9. The method as claimed in claim 1, wherein the step of determining a peak value of the activity signal in a first time window of the frame comprises determining the largest value of a magnitude of the activity signal in the first time window of the frame.

10. The method as claimed in claim 1, wherein the step of determining a peak value of the activity signal in a second time window of the frame comprises determining the largest value of a magnitude of the activity signal in the second time window of the frame.

11. The method as claimed in claim 1, wherein calculating the ratio of the peak value of the activity signal in the first time window of the frame to the peak value of the activity signal in the second time window of the frame comprises,
applying a median filter to a set of ratio values from a plurality of frames.

12. The method as claimed in claim 11, wherein calculating the ratio of the peak value of the activity signal in the first time window of the frame to the peak value of the activity signal in the second time window of the frame further comprises applying a smoothing filter to the filtered ratio to generate the calculated ratio.

13. The method as claimed in claim 1, wherein calculating the ratio of the peak value of the activity signal in the first time window of the frame to the peak value of the activity signal in the second time window of the frame further comprises applying a smoothing filter to a ratio of the peak value of the activity signal in the first time window of the frame to the peak value of the activity signal in the second time window of the frame to generate the calculated ratio.

14. The method as claimed in claim 1, further comprising, if it is determined that the calculated ratio exceeds the threshold in a frame,
comparing the calculated ratio to a second threshold, and determining that, in frames in which the calculated ratio drops below the second threshold value, there is no longer motion of an object relative to the detector.

15. The method as claimed in claim 1, further comprising outputting a signal if it is determined that there is motion of an object relative to the detector.

16. The method as claimed in claim 1, further comprising setting at least one of a duration and a time position of the first time window to correspond to an intended detection range of the detector.

17. An ultrasonic motion activity detector comprising modules to, in each of a series of frames:
obtain an ultrasonic signal derived from a transmitted ultrasonic signal;
derive an activity signal based on a difference between the obtained signal in a present frame and at least one previous frame;
determine a peak value of the activity signal in a first time window of the frame;
determine a peak value of the activity signal in a second time window of the frame, wherein
the first time window is different from the second time window;
calculate a ratio of the peak value of the activity signal in the first time window of the frame to the peak value of the activity signal in the second time window of the frame;
compare the calculated ratio with a threshold value, and, in frames in which the calculated ratio exceeds the threshold value, determine that there is motion of an object relative to the detector.

18. An electronic device comprising an ultrasonic motion activity detector as claimed in claim 17.

19. An electronic device as claimed in claim 18, comprising a smartphone, motion sensor, camera, monitor, laptop or tablet computer, or games console.

20. A computer program product, comprising a tangible computer readable medium containing instructions for causing a processor to perform a method according to claim 1.

* * * * *